(12) United States Patent
Chou

(10) Patent No.: US 7,579,721 B2
(45) Date of Patent: Aug. 25, 2009

(54) CHAIN SUPPORT STRUCTURE FOR A PLANAR MOTOR

(75) Inventor: Chin-Hsing Chou, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 123 days.

(21) Appl. No.: 11/777,286

(22) Filed: Jul. 13, 2007

(65) Prior Publication Data
US 2009/0015086 A1   Jan. 15, 2009

(51) Int. Cl.
*H02K 41/00* (2006.01)
(52) U.S. Cl. ............................................. 310/12
(58) Field of Classification Search ................. 310/12, 310/16; 355/72, 53
See application file for complete search history.

(56) References Cited

U.S. PATENT DOCUMENTS

| | | | | |
|---|---|---|---|---|
| 3,576,454 A | * | 4/1971 | Beach et al. ................... | 310/16 |
| 3,735,231 A | * | 5/1973 | Sawyer ......................... | 318/687 |
| 5,140,242 A | * | 8/1992 | Doran et al. .................. | 318/640 |
| 5,841,207 A | * | 11/1998 | Correns et al. ................ | 310/12 |
| 6,189,576 B1 | * | 2/2001 | Markward .................... | 139/54 |
| 6,452,293 B1 | * | 9/2002 | Roither ........................ | 310/12 |
| 7,301,602 B2 | * | 11/2007 | Sato et al. ..................... | 355/30 |
| 2007/0273861 A1 | * | 11/2007 | Sato et al. ..................... | 355/72 |

* cited by examiner

*Primary Examiner*—Michael C Zarroli
(74) *Attorney, Agent, or Firm*—Banger Shia

(57) ABSTRACT

A chain support structure for a planar motor comprises: a fixing base, a support arm and a load-bearing member, the fixing base is fixed to the stator, the support arm has one end connected to the fixing base and has the other end connected to the load-bearing member, respectively, and the load-bearing member supports the chain from the gravity direction of the chain the chain, so as to prevent the chain from the gravity-caused sag of the chain, and prevent the abrasion or damage caused by the chain rubbing against the stator.

13 Claims, 7 Drawing Sheets

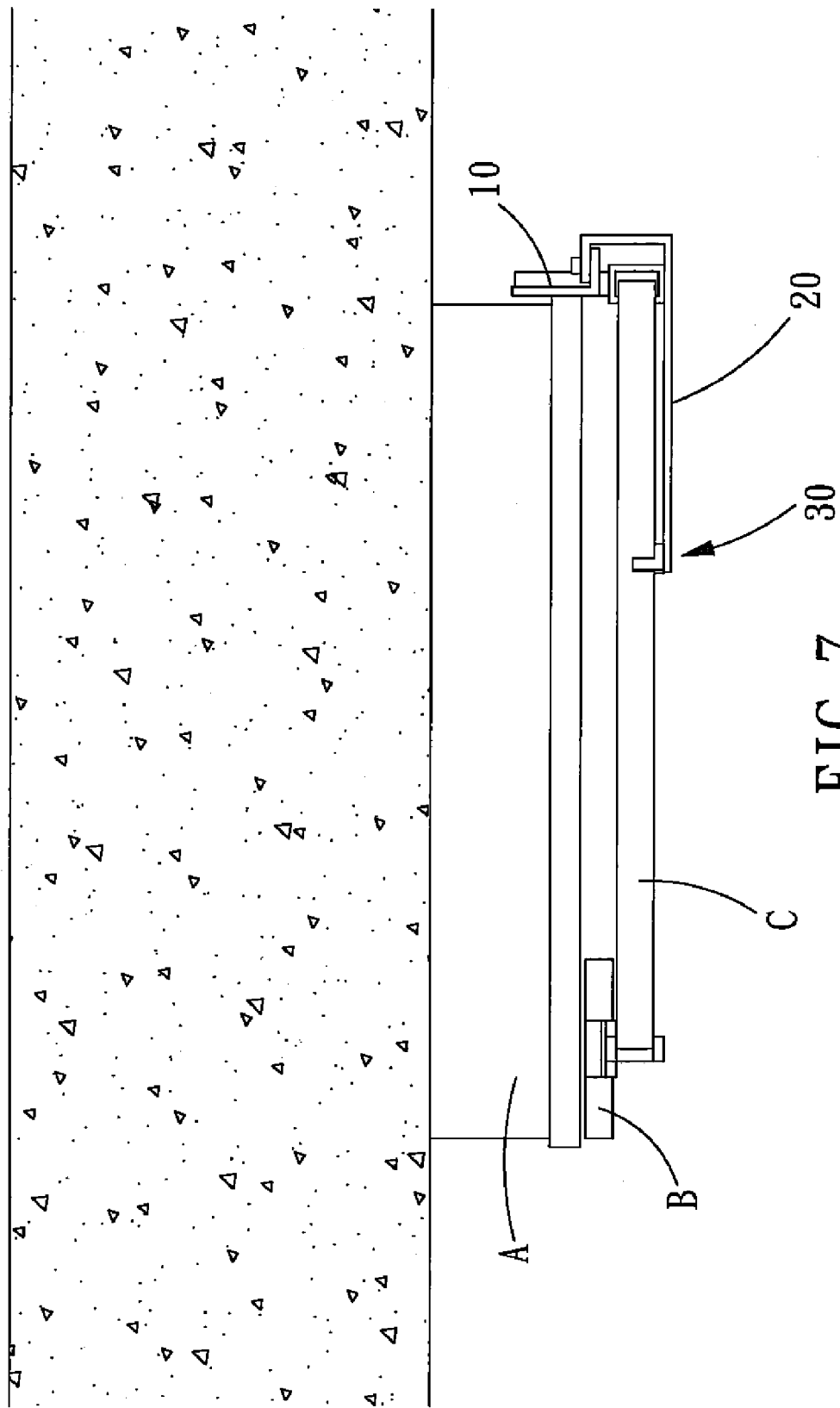

CHAIN SUPPORT STRUCTURE FOR A PLANAR MOTOR

BACKGROUND OF THE INVENTION

1. Field of the Invention

The present invention relates to a chain support structure for a planar motor, and more particularly to a chain support structure for a planar motor, which is mounted on a stator with a plane to support a chain from the gravity direction of the chain.

2. Description of the Prior Art

The basic configuration of a motor is that magnets are disposed on the stator, and the mover with coil windings is energized to produce a magnetic field which enables the mover to move with respect to the stator. And the stator of a planar motor is flat plate-shaped and is provided with a plane on which being arranged a plurality of magnets, and the adjacent ends of neighboring magnets have different polarities. In the mover are disposed coil windings and an air-injection device which injects air to the stator to suspend the mover above the stator. By energizing the coil windings inside the mover, the mover can produce a magnetic field to make the mover move with respect to the stator.

However, conventionally, the pipeline for supplying power and air to the mover is directly connected to the outside, and the wire for controlling the mover must also be directly connected to the outside machine, so that the wire and the pipeline are exposed outside the mover, which will affect the operation of motor, or even worse, the user accidentally kicks or touches the wire or the pipeline and makes the mover fall to the ground, the motor will be damaged or stop working.

Therefore, another planar motor appeared on the market, as shown in FIG. 1, wherein a chain C is disposed on the stator A and is connected to the mover B, so that the wire and the pipeline of the mover B can be connected to the outside via the chain C.

Such a planar can solve the problem stated above that the wire and the pipeline are exposed to outside, at the same time, however, it will have some other problems as follows:

1) abrasion of the stator: since the chain C has weight, the mid of which will hang down to rub against the stator A when it is connected between the stator A and the mover B, as shown in FIG. 2, thus causing abrasion of the chain C and the stator A.

2) accuracy reduction: the abrasion of the chain C and the stator A will produce abrasion dusts which will affect the movement accuracy of the mover B with respect to the stator A, and the abrasion of the stator A will also affect the movement accuracy of the mover B.

3) increase in maintenance cost: due to the problem of wear and tear, the chain C and the stator A must be maintained frequently in order to ensure the accuracy of the movement of the mover B, thus increasing the maintenance cost.

The present invention has arisen to mitigate and/or obviate the afore-described disadvantages.

SUMMARY OF THE INVENTION

The primary objective of the present invention is to prevent the chain from rubbing against the stator of a planar motor.

The secondary objective of the present invention is to improve the operation accuracy of the planar motor.

The third objective of the present invention is to reduce the maintenance cost of the planar motor.

To achieve the above objectives, a chain support structure for a planar motor is mounted on a stator with a plane to support a chain from the gravity direction of the chain, so as to prevent the chain from the gravity-caused sag of the chain.

The arrangements can prevent the chain from rubbing against the stator of a planar motor, while improving the movement accuracy of the mover and reducing the maintenance cost caused by abrasion.

The chain support structure for a planar motor comprises: a fixing base, a support arm and a load-bearing member, the fixing base is fixed to the stator, the support arm has one end connected to the fixing base and has the other end connected to the load-bearing member, respectively, and the load-bearing member supports the chain from the gravity direction of the chain.

BRIEF DESCRIPTION OF THE DRAWINGS

FIG. 7 shows that the planar motor with a chain support structure in accordance with the present invention is fixed to the ceiling.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
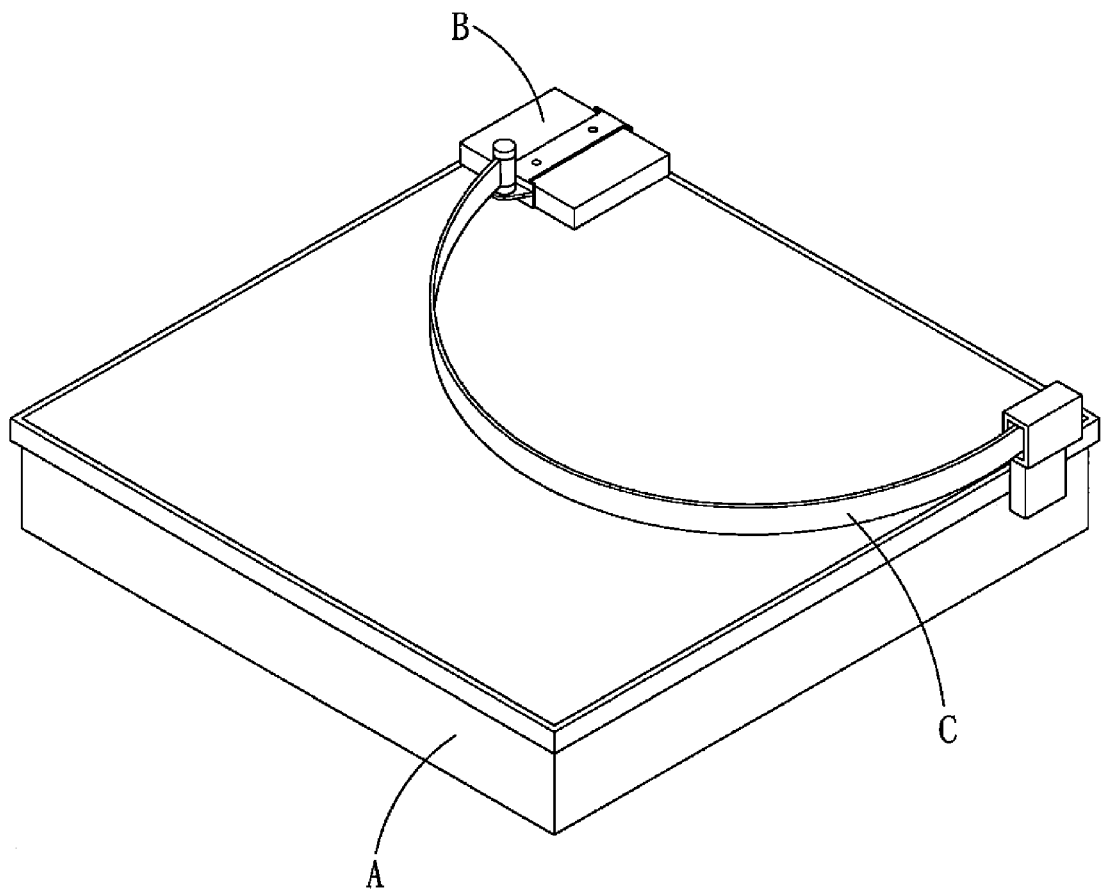
FIG. 1 is a perspective view of a conventional planar motor.
Figure 2:
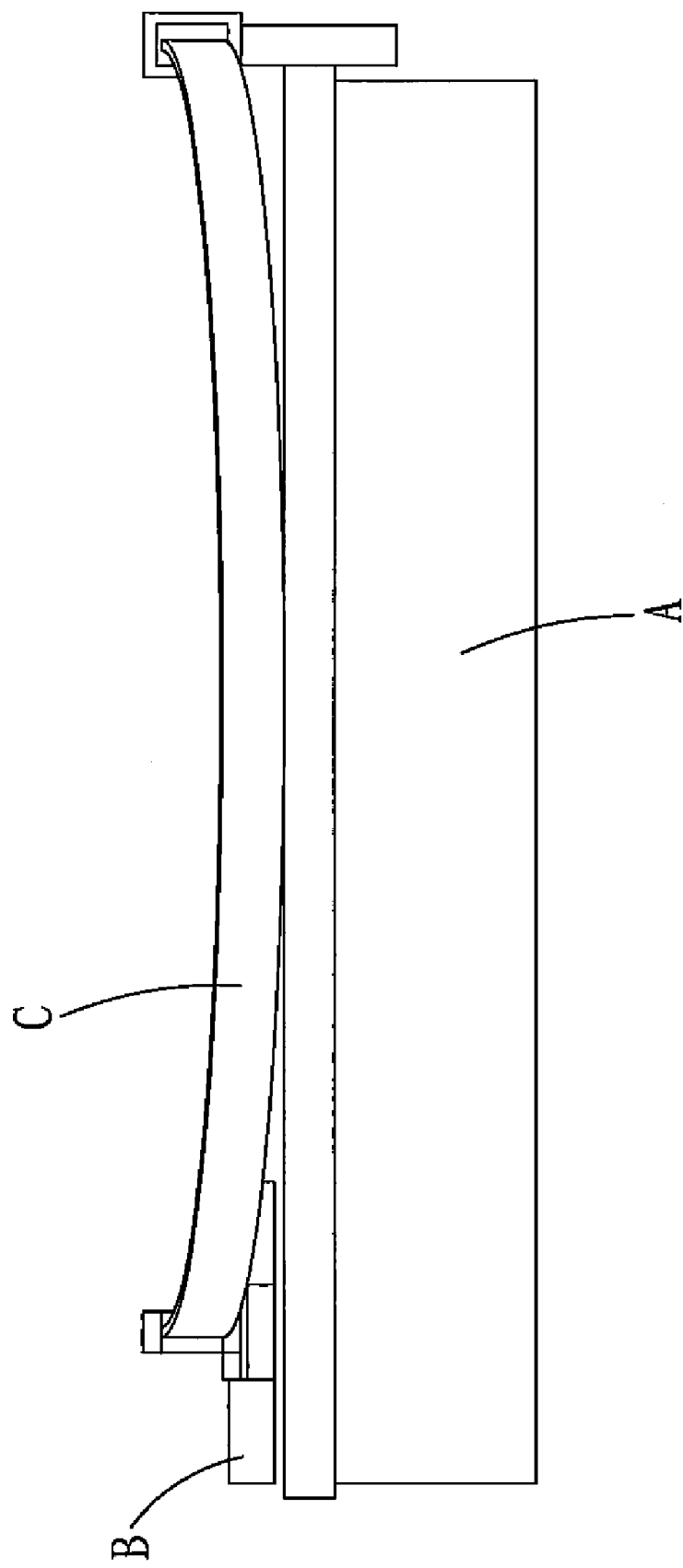
FIG. 2 shows that the chain of the conventional planar motor rubs against the stator.
Figure 3:
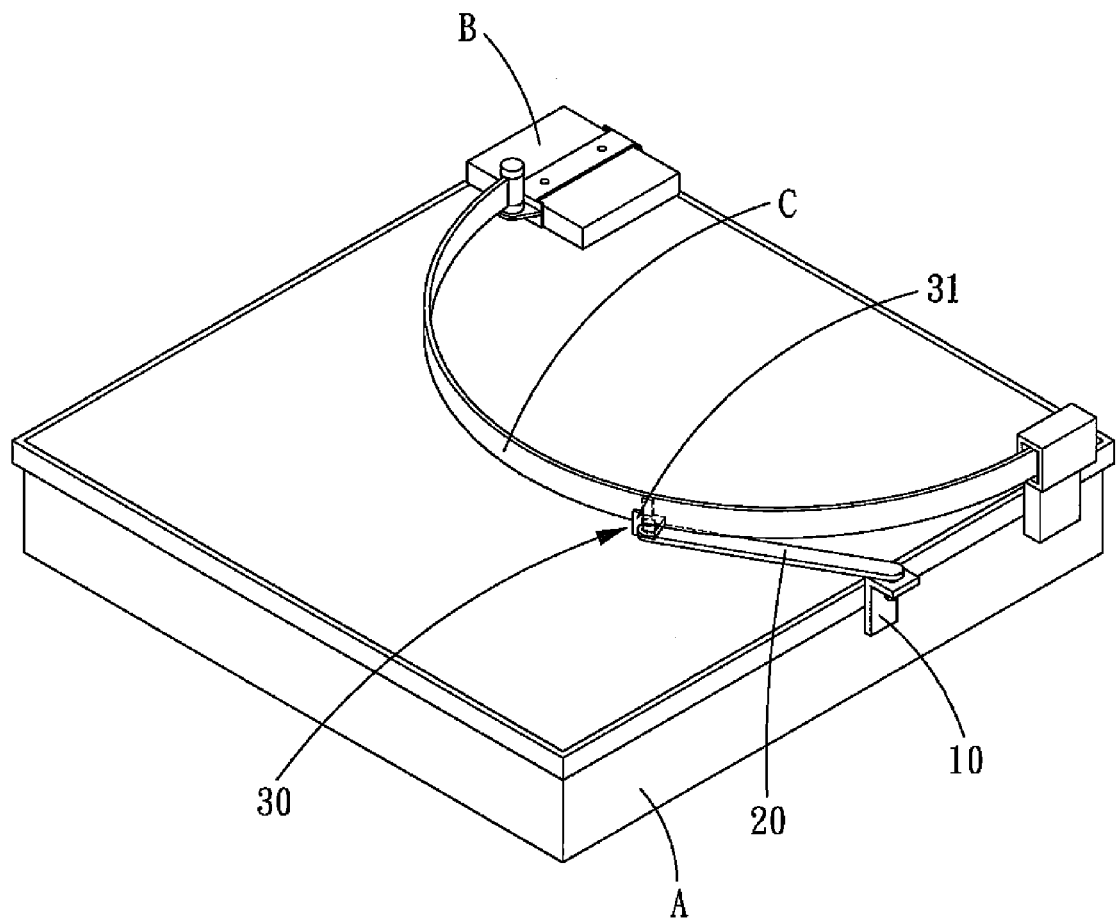
FIG. 3 is a perspective view of a planar motor with a chain support structure in accordance with the present invention.
Figure 4:
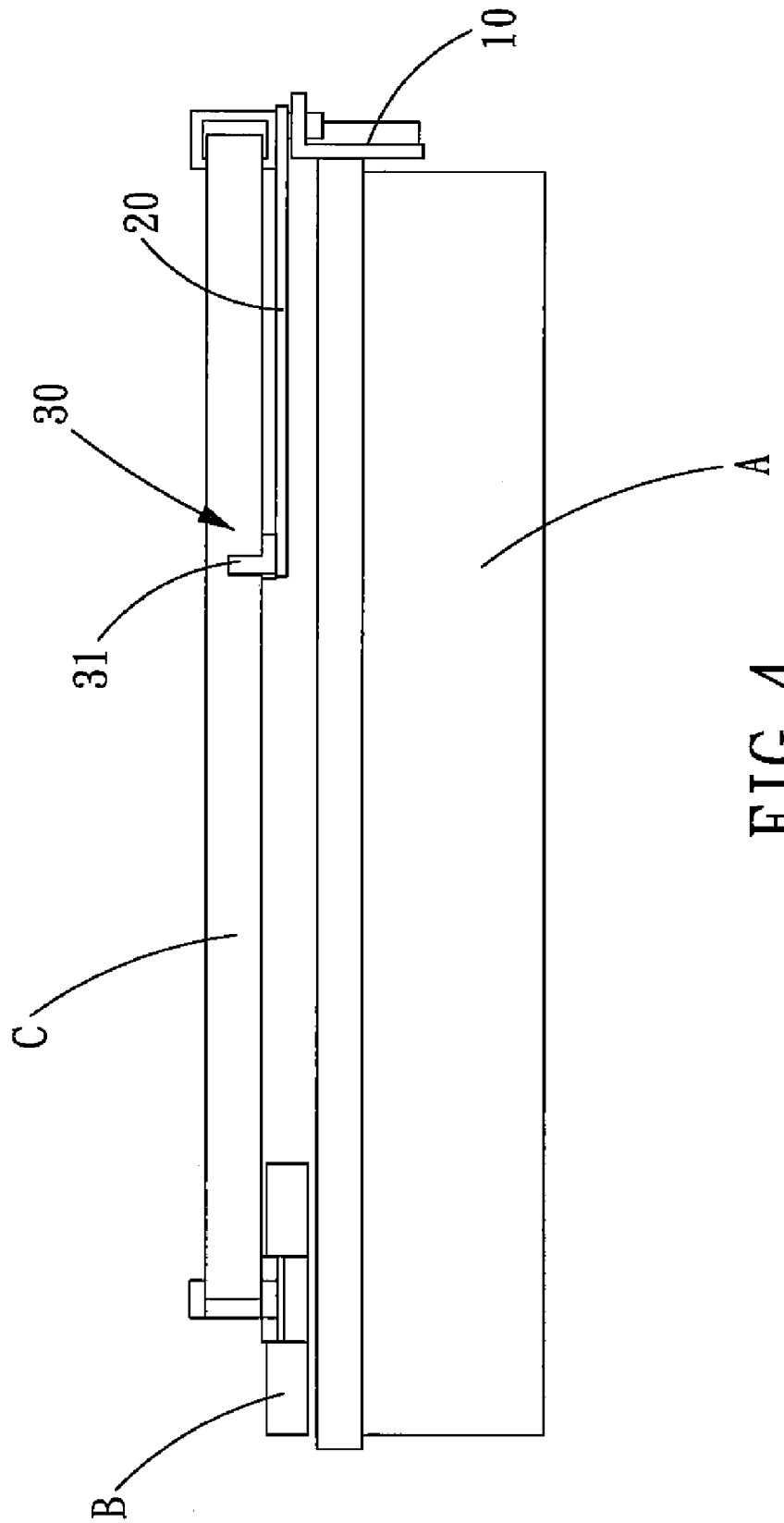
FIG. 4 is a side view of FIG. 3.

Referring to FIGS. 3 and 4, a chain support structure for a planar motor in accordance with the present invention has one end mounted on a side of the planar motor A, and the other end of the support structure supports the chain C from the gravity direction of the chain C. The chain support structure comprises: a fixing base 10, a support arm 20, and a load-bearing member.

The fixing base 10 is fixed to the stator A.

The support arm 20 has one end pivotally connected to fixing base 10 and is rotatable with respect to the plane of the stator A.

The load-bearing member 30 has one side pivotally mounted on the other end of the support arm 20 and is rotatable with respect to the plane of the stator A. The other side of the load-bearing member 30 is used to support the chain C. In this embodiment, the side of the load-bearing member 30 supporting the chain C is formed with two limit blocks 31 for ensuring a better positioning of the chain C.

It is apparent from the above that the chain support structure employs the load-bearing member 30 to support the chain C from the gravity direction of the chain C; therefore, it has the following advantages:

1). Prevention of friction: since the load-bearing member supports the chain from the gravity direction of the chain, it can reduce the degree of sag of the chain C or even can prevent the chain C from hanging down, and solve the friction problem between the chain C and the stator A.

2) increase of accuracy: since the chain C doesn't rub against the stator A, the mover B and the stator A will be free of the problems of abrasions dusts and abrasion, ensuring that the mover B can move accurately on the stator A, and improving the operation accuracy.

3) reduction in maintenance cost: since the chain C doesn't rub against the stator A, and the mover B is suspended above the stator A, the stator A is almost free of abrasion, thus reducing the number of times and probability of maintenance and the maintenance cost.

Figure 5:
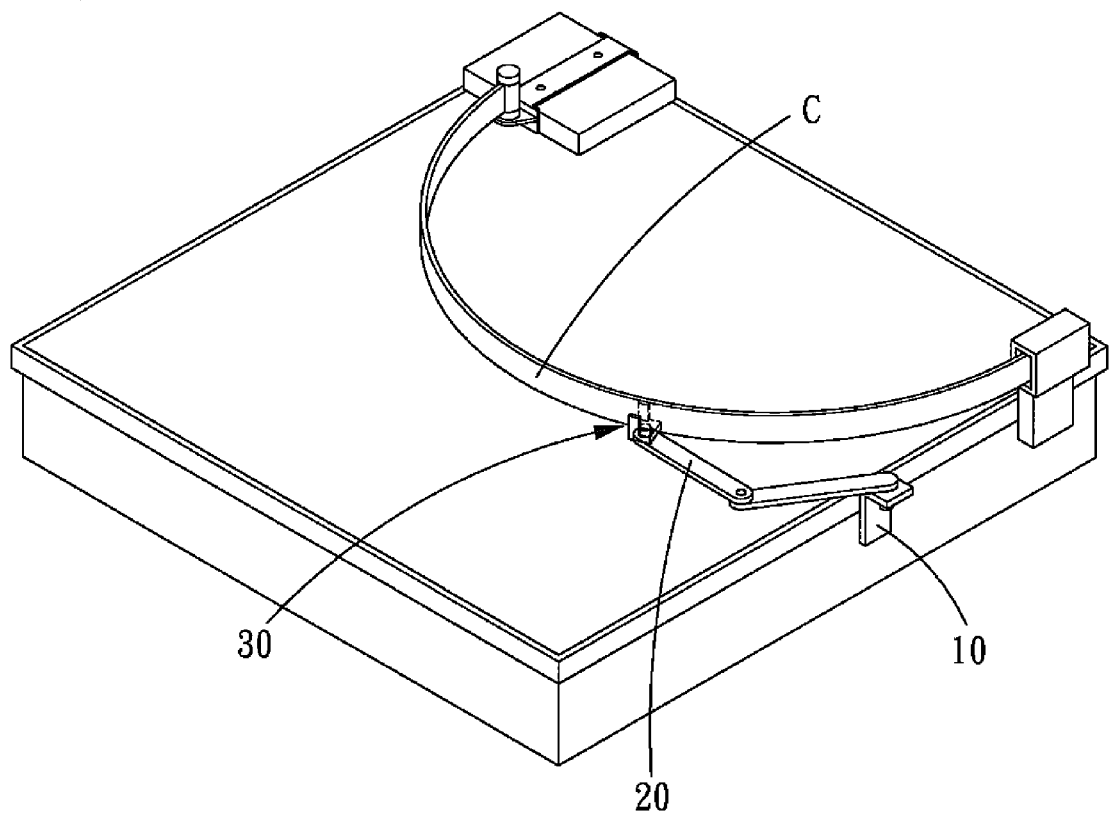
FIG. 5 shows a chain support structure of a planar motor in accordance with another embodiment of the present invention, wherein the support arm is made up of two connected rods.
Figure 6:
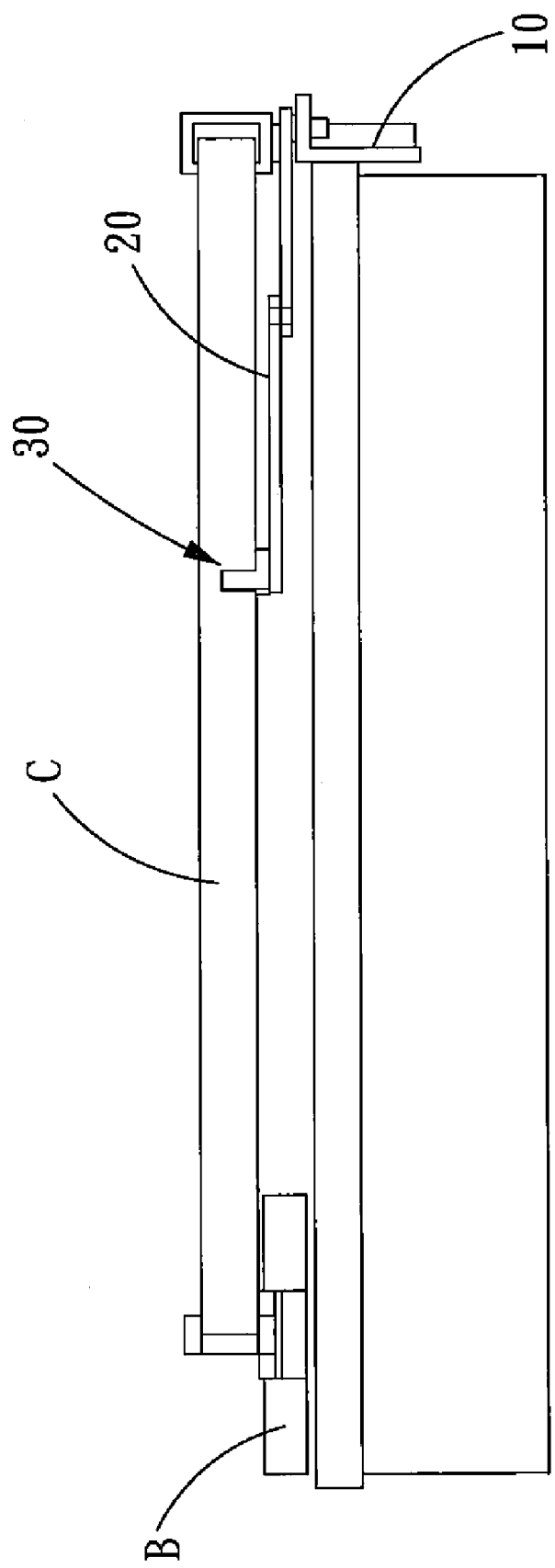
FIG. 6 is a side view of FIG. 5.

In addition, the chain support structure can also be as shown in FIGS. 5 and 6, wherein the support arm 20 is made up of two connected rods, and it varies in forms to meet the user's requirement.

Moreover, if the planar motor is suspended to the ceiling, as shown in FIG. 7, the air-injection interaction between the mover B and the stator A is replaced by magnetic force, when the gravity of the mover B is balanced by the magnetic force, the mover B can also be suspended above and move with respect to the stator A. And the load-bearing member 30 supports the chain C from the gravity direction of the chain C for maintaining the mover B within the magnetic interaction range with respect to the stator A.

While we have shown and described various embodiments in accordance with the present invention, it is clear to those skilled in the art that further embodiments may be made without departing from the scope of the present invention.

What is claimed is:

1. A chain support structure for a planar motor being mounted on a stator with a plane to support a chain of the planar motor, and comprising: a fixing base, a support arm and a load-bearing member, the fixing base is fixed to the stator, the support arm is connected to the fixing base and the load-bearing member, and the load-bearing member supports the chain;
   the load-bearing member has one side pivotally mounted on the other end of the support arm and is rotatable with respect to the plane of the stator, and the other side of the load-bearing member is used to support the chain.

2. The chain support structure for a planar motor as claimed in claim 1, wherein the support arm has one end pivotally disposed on the fixing base and is rotatable with respect to the plane of the stator.

3. The chain support structure for a planar motor as claimed in claim 1, wherein a side of the load-bearing member supporting the chain is formed with two limit blocks for ensuring a better positioning of the chain.

4. The chain support structure for a planar motor as claimed in claim 1, wherein the support arm has one end pivotally disposed on the fixing base and is rotatable with respect to the plane of the stator, the load-bearing member has one side pivotally mounted on the other end of the support arm and is rotatable with respect to the plane of the stator, and the other side of the load-bearing member is used to support the chain.

5. The chain support structure for a planar motor as claimed in claim 4, wherein a side of the load-bearing member supporting the chain is formed with two limit blocks for ensuring a better positioning of the chain.

6. The chain support structure for a planar motor as claimed in claim 1, wherein the support arm is made of two connected rods.

7. The chain support structure for a planar motor as claimed in claim 2, wherein the support arm is made of two connected rods.

8. A chain support structure for a planar motor, comprising:
   a fixing base mounted on a stator with a plane;
   a support arm connected to the fixing base; and
   a load-bearing member connected to the support arm for supporting a chain from the gravity direction of the chain;
   the support arm has one end pivotally disposed on the fixing base and is rotatable with respect to the plane of the stator; the load-bearing member has one side pivotally mounted on the other end of the support arm and is rotatable with respect to the plane of the stator, and the other side of the load-bearing member is used to support the chain.

9. The chain support structure for a planar motor as claimed in claim 8, wherein a side of the load-bearing member supporting the chain is formed with two limit blocks for ensuring a better positioning of the chain.

10. The chain support structure for a planar motor as claimed in claim 8, wherein the support arm has one end pivotally disposed on the fixing base and is rotatable with respect to the plane of the stator, the load-bearing member has one side pivotally mounted on the other end of the support arm and is rotatable with respect to the plane of the stator, and the other side of the load-bearing member is used to support the chain.

11. The chain support structure for a planar motor as claimed in claim 10, wherein a side of the load-bearing member supporting the chain is formed with two limit blocks for ensuring a better positioning of the chain.

12. The chain support structure for a planar motor as claimed in claim 8, wherein the support arm is made of two connected rods.

13. The chain support structure for a planar motor as claimed in claim 8, wherein the support arm is made of two connected rods.

* * * * *